United States Patent
Nishiyama et al.

(10) Patent No.: US 9,204,003 B2
(45) Date of Patent: Dec. 1, 2015

(54) FACSIMILE APPARATUS

(71) Applicant: KYOCERA Document Solutions Inc., Osaka (JP)

(72) Inventors: Masahiro Nishiyama, Osaka (JP); Kentaro Okamoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/569,247

(22) Filed: Dec. 12, 2014

(65) Prior Publication Data

US 2015/0172499 A1    Jun. 18, 2015

(30) Foreign Application Priority Data

Dec. 12, 2013 (JP) ................. 2013-256602

(51) Int. Cl.
*G06F 3/12* (2006.01)
*H04N 1/36* (2006.01)
*H04N 1/40* (2006.01)
*H04N 1/00* (2006.01)
*H04N 1/32* (2006.01)

(52) U.S. Cl.
CPC ......... *H04N 1/00933* (2013.01); *H04N 1/0044* (2013.01); *H04N 1/32363* (2013.01); *H04N 1/32459* (2013.01); *H04N 2201/0093* (2013.01); *H04N 2201/3215* (2013.01); *H04N 2201/3245* (2013.01)

(58) Field of Classification Search
None
See application file for complete search history.

(56) References Cited

U.S. PATENT DOCUMENTS

| | | | | |
|---|---|---|---|---|
| 4,947,268 A * | 8/1990 | Nakajiri | ............ | H04N 1/00095 358/426.1 |
| 5,790,939 A * | 8/1998 | Malcolm | ............ | H04B 7/2125 370/324 |
| 6,016,553 A * | 1/2000 | Schneider | ........... | G06F 11/1435 714/21 |
| 6,393,566 B1 * | 5/2002 | Levine | ........... | 713/178 |
| 6,408,337 B1 * | 6/2002 | Dietz | ........... | G06Q 10/10 709/229 |
| 6,421,146 B1 * | 7/2002 | Yoo | ........... | H04N 1/4076 358/461 |
| 6,449,062 B1 * | 9/2002 | Endo | ........... | 358/400 |

(Continued)

FOREIGN PATENT DOCUMENTS

JP    2000-196847    7/2000

OTHER PUBLICATIONS

The extended European search report issued by European Patent Office in the corresponding European patent application No. 14197178.8—10 pages.

*Primary Examiner* — Madelein Nguyen
(74) *Attorney, Agent, or Firm* — Knobbe, Martens, Olson & Bear LLP

(57) ABSTRACT

A facsimile apparatus includes a data acquisition section, a timer section, an image processing section, a storage section, a fax transmission section, a reference time changing section, and a time modifying section. When the reference time changing section changes a reference time in the middle of fax transmission from the fax transmission section to a destination, the time modifying section standardizes times of day for use in generating time-stamp representations to be synthesized on all pieces of page data being subject to the fax transmission to the times of day in either the reference time before or after being changed. Thus, a facsimile apparatus as the destination obtains images of the pieces of page data to which their respective time-stamp representations indicating the transmission times of day having consistency with the reference time either before or after being changed are attached.

8 Claims, 12 Drawing Sheets

(56) References Cited

U.S. PATENT DOCUMENTS

| | | | |
|---|---|---|---|
| 6,552,827 B1 | 4/2003 | Shimoosawa et al. | |
| 6,700,973 B1 * | 3/2004 | Suzuki | H04M 3/42314 379/283 |
| 6,842,768 B1 * | 1/2005 | Shaffer | H03M 7/30 709/203 |
| 7,072,080 B1 * | 7/2006 | Yamamoto | G04G 5/00 358/406 |
| 9,042,952 B2 * | 5/2015 | Lynn | A61B 5/00 600/324 |
| 2003/0088427 A1 * | 5/2003 | Elsey | G06Q 30/0281 705/346 |
| 2003/0214678 A1 * | 11/2003 | Shibata | H04L 12/5875 358/405 |
| 2004/0044941 A1 * | 3/2004 | Hatley | 714/752 |
| 2004/0145778 A1 * | 7/2004 | Aoki | H04N 1/32117 358/1.15 |
| 2005/0046906 A1 * | 3/2005 | Tomida | H04N 1/00204 358/407 |
| 2006/0088160 A1 * | 4/2006 | Brown et al. | 380/51 |
| 2006/0230277 A1 * | 10/2006 | Trinkel | 713/178 |
| 2007/0023507 A1 * | 2/2007 | Starbuck et al. | 235/382 |
| 2007/0028052 A1 * | 2/2007 | Armstrong | G06F 9/5077 711/129 |
| 2007/0079374 A1 * | 4/2007 | Yasui | G06F 21/84 726/22 |
| 2007/0214363 A1 * | 9/2007 | Ishii | 713/178 |
| 2009/0213427 A1 * | 8/2009 | Walmsley | 358/1.15 |
| 2012/0243039 A1 * | 9/2012 | Miyata et al. | 358/1.15 |
| 2012/0268766 A1 * | 10/2012 | Okubo | H04N 1/00217 358/1.13 |
| 2012/0317253 A1 * | 12/2012 | Maekawa | H04L 41/0816 709/221 |
| 2013/0335595 A1 * | 12/2013 | Lee et al. | 348/231.5 |
| 2014/0029053 A1 * | 1/2014 | Suese | H04N 1/00395 358/1.15 |
| 2014/0095887 A1 * | 4/2014 | Nayshtut et al. | 713/189 |
| 2014/0281523 A1 * | 9/2014 | Golino | 713/168 |

* cited by examiner

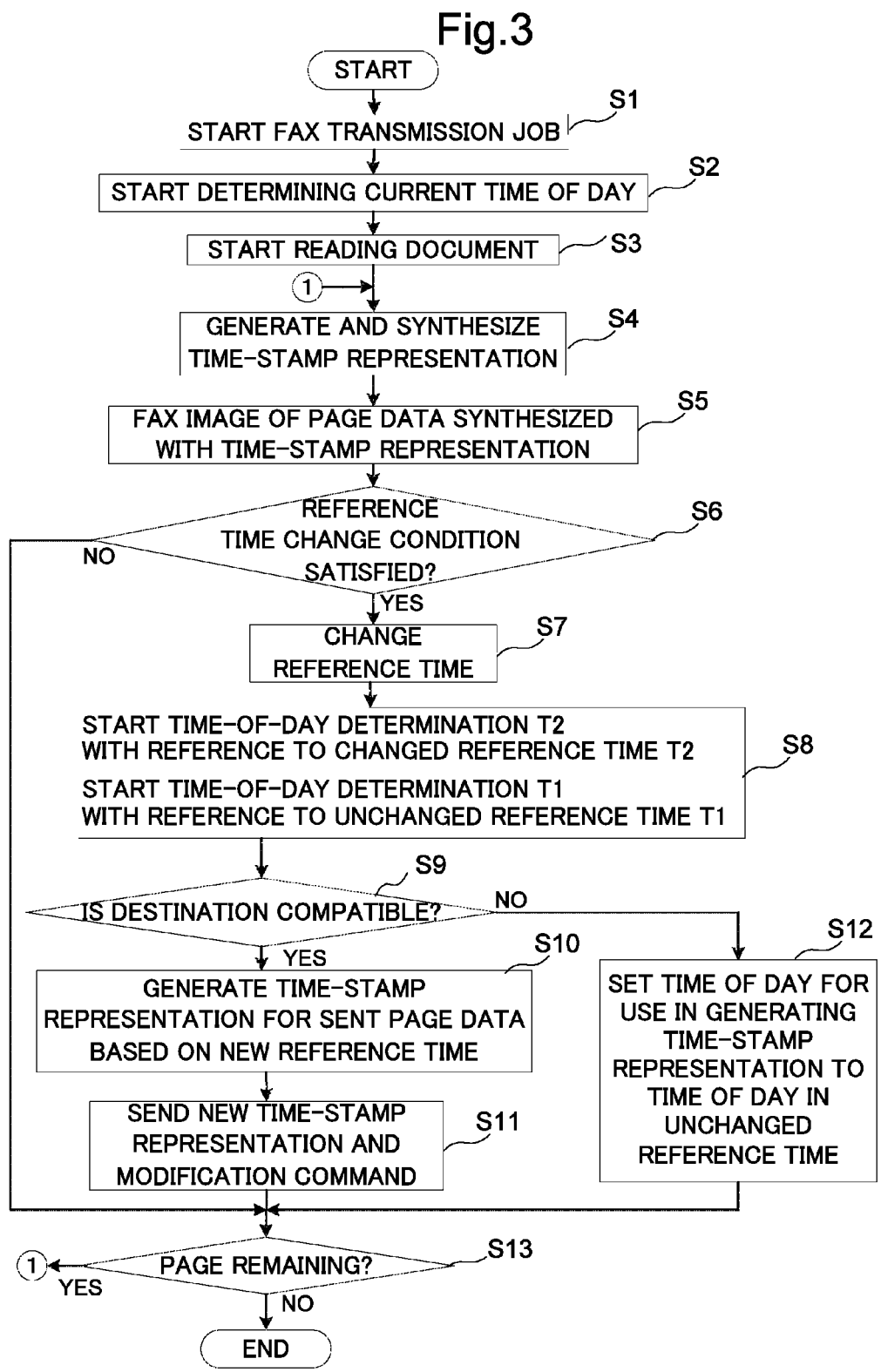

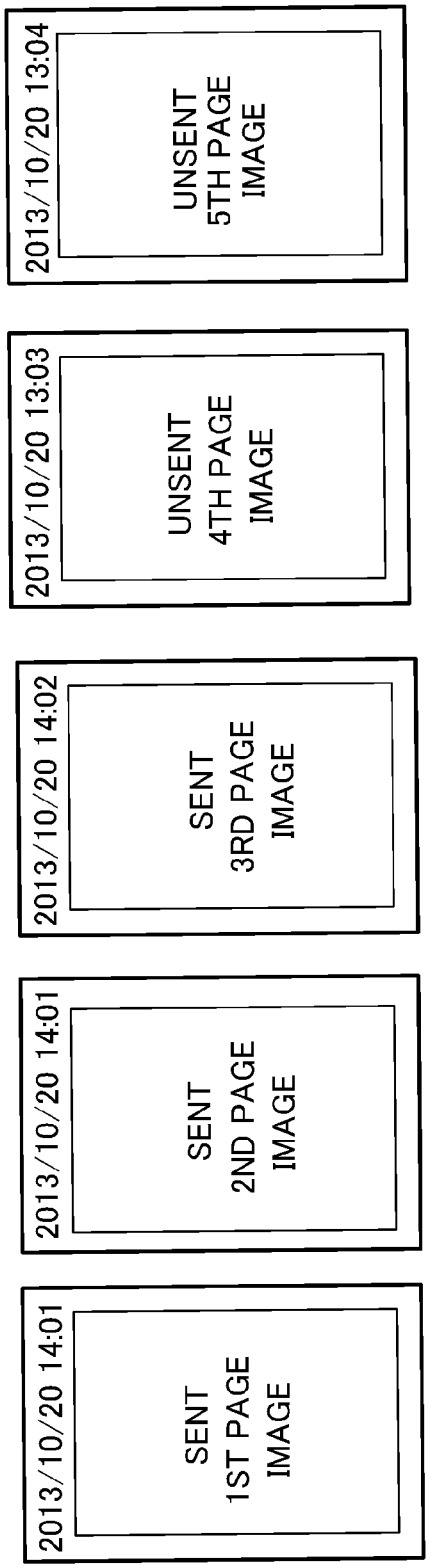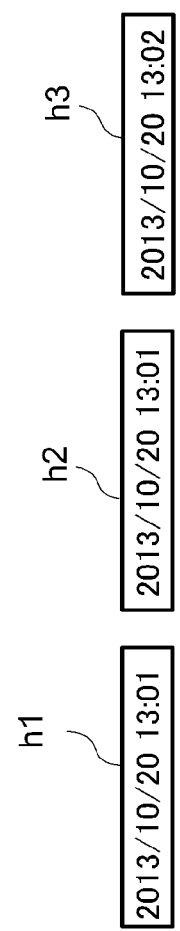

FACSIMILE APPARATUS

INCORPORATION BY REFERENCE

This application claims priority to Japanese Patent Application No. 2013-256602 filed on Dec. 12, 2013, the entire contents of which are incorporated by reference herein.

BACKGROUND

The present disclosure relates to facsimile apparatuses and particularly relates to a technique for changing data which is subject to fax transmission.

Most facsimile apparatuses employ a technique in which in transmitting an image of an original document being subject to fax transmission to a destination facsimile apparatus, a representation of additional time-stamp information indicating, for example, a fax transmission date and time is attached as a header, a footer or the like to the image of the original document.

There is also proposed a facsimile apparatus configured to display on a display screen an image of an original document being subject to fax transmission, acquired by scanning the original document, receive a command to edit the image data from an operator, enable editing of the image data using the display screen, and fax the image of the original document modified into a user-desired content by the editing.

SUMMARY

A technique improved over the aforementioned techniques is proposed as one aspect of the present disclosure.

A facsimile apparatus according to an aspect of the present disclosure includes a data acquisition section, a timer section, an image processing section, a storage section, a fax transmission section, a reference time changing section, and a time modifying section.

The data acquisition section is configured to acquire data being subject to fax transmission as a set of pieces of page data on a page-by-page basis.

The timer section is configured to keep a reference time to determine a time of day.

The image processing section is configured to generate, for each of the set of pieces of page data acquired by the data acquisition section, a time-stamp representation indicating the time of day determined by the timer section and synthesize the time-stamp representation on the each of the set of piece of page data.

The storage section is configured to temporarily store the pieces of page data synthesized with the respective time-stamp representations by the image processing section.

The fax transmission section is configured to retrieve the temporarily stored pieces of page data in the storage section on a page-by-page basis and fax retrieved pieces of page data to a designated destination on a page-by-page basis in page order.

The reference time changing section is configured to change, under a predetermined condition, the reference time being kept by the timer section.

The time modifying section is configured to, when in the middle of the fax transmission from the fax transmission section to the destination the reference time changing section changes the reference time being kept by the timer section, perform time standardization for standardizing the times of day for use by the image processing section to generate the time-stamp representations, which are to be synthesized on all the set of pieces of page data being subject to the fax transmission, to the times of day in either the unchanged reference time before being changed or the changed reference time after being changed.

BRIEF DESCRIPTION OF THE DRAWINGS

FIG. 3 is a flowchart showing an example of fax transmission processing of the multifunction peripheral according to the first embodiment.

FIG. 4A is a view showing an example of page images being subject to fax transmission.

FIG. 4B is a view showing an example of header images as time-stamp representations newly generated on a page-by-page basis.

DETAILED DESCRIPTION

Figure 1:
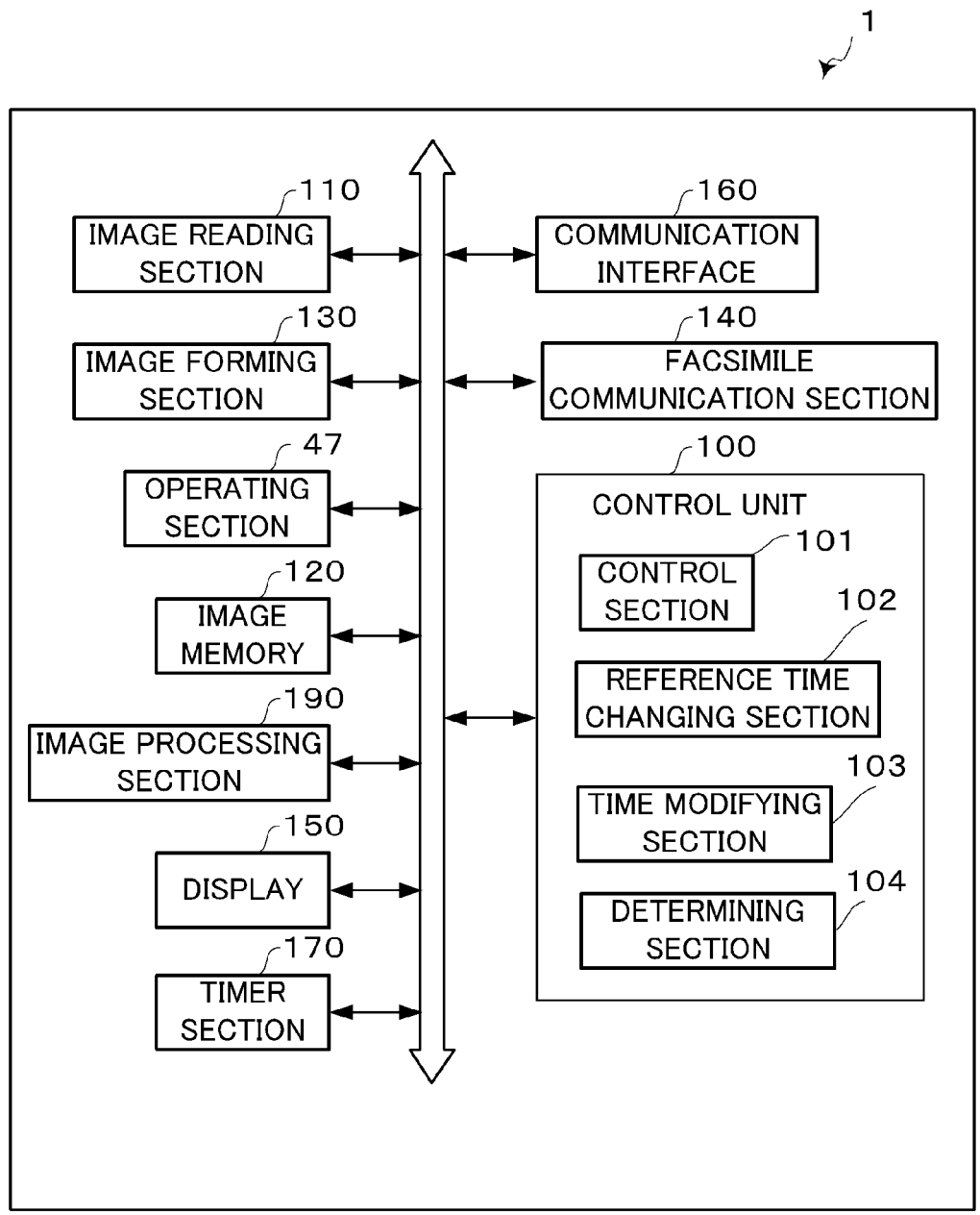
FIG. 1 is a block diagram schematically showing the internal configuration of a multifunction peripheral serving as a facsimile apparatus according to a first embodiment of the present disclosure.

Hereinafter, a description will be given of a facsimile apparatus according to an embodiment as one aspect of the present disclosure and a fax communication program for use in the facsimile apparatus with reference to the drawings. FIG. 1 is a block diagram schematically showing the internal configuration of a multifunction peripheral serving as a facsimile apparatus according to a first embodiment of the present disclosure.

The multifunction peripheral 1 according to the first embodiment includes a control unit 100, an image reading section 110, an image memory 120, an image forming section 130, and a facsimile communication section 140.

The image reading section 110 includes a scanner or the like configured to read an original document and acquire an image of the original document. The image reading section 110 is an ADF (auto document feeder) including: a scanner configured to scan images of original documents, for example, placed on a document loading chute and conveyed to an original glass plate; and an ejection mechanism for ejecting the scanned original documents. The image reading section 110 is an example of the data acquisition section and is configured to read original documents being subject to fax transmission sheet by sheet and thus acquire, as data being subject to fax transmission, a set of pieces of page data of the original documents (images of the original documents), together with information about each page, on a page-by-page basis. Also subject to fax transmission can be a set of pieces of page data of original documents acquired from a personal computer or the like connected via a network to the multifunction peripheral 1. Therefore, a communication interface 160 is also an example of the data acquisition section.

The image memory 120 is a region for temporarily storing data to be printed by the image forming section 130, such as the pieces of page data of original documents read by the image reading section 110 or the pieces of page data acquired by the facsimile communication section 140 or the communication interface 160 and being subject to facsimile transmission. The image memory 120 functions as a storage section configured to temporarily store a set of pieces of page data of original documents acquired by the image reading section 110.

The image forming section 130 is configured to retrieve data stored in the image memory 120, such as the pieces of page data of original documents read by the image reading section 110 or the pieces of page data received from another facsimile apparatuses over a public line by the facsimile communication section 140, and form an image (print) using the retrieved data.

The facsimile communication section 140 is configured to perform various functions necessary for facsimile communication and send and receive image data to and from external facsimile apparatuses over public lines. For example, the control section 101 retrieves, in page order, the set of pieces of page data of original documents for fax transmission read by the image reading section 110 and temporarily stored in the image memory 120 and allows the facsimile communication section 140 to fax the retrieved set of pieces of page data to a destination facsimile apparatus designated by a user's operation of an operating section 47.

The multifunction peripheral 1 further includes an image processing section 190 configured to edit and process the images read by the image reading section 110. The image processing section 190 is configured to, in faxing each of the pieces of page data forming images of original documents, acquired by the reading of the image reading section 110, generate a time-stamp representation indicating a transmission time of day determined by a timer section 170 and synthesize the time-stamp representation on the associated piece of page data. The determination of the fax transmission time of day and synthesis of the time-stamp representation are made for each piece of page data.

The multifunction peripheral 1 further includes the communication interface 160 for use to communicate various data with external personal computers and servers connected thereto via a network.

The control unit 100 is formed of a CPU, a ROM, a RAM, and so on and governs the overall operation of the multifunction peripheral 1. The control unit 100 includes a control section 101, a reference time changing section 102, a time modifying section 103, and a determining section 104. An unshown HDD or ROM stores a fax communication program for the multifunction peripheral 1. The control unit 100 functions as the reference time changing section 102, the time modifying section 103 or the determining section 104 by operating according to the fax communication program. However, each of the reference time changing section 102, the time modifying section 103, and the determining section 104 may not be implemented by the operation according to the fax communication program but may be constituted by a hardware circuit. Hereinafter, unless otherwise stated, the same applies to other embodiments.

The control section 101 governs the overall operation of the multifunction peripheral 1.

The reference time changing section 102 is configured to change, under a predetermined condition, the reference time being kept by the timer section 170 to determine a time of day. Specifically, the reference time changing section 102 changes the reference time being kept by the timer section 170 because of, for example, (1) the switchover between daylight-saving time (summer time) and standard time (winter time) in countries adopting daylight-saving time or (2) the calibration of the reference time being kept by the timer section 170 (such as an automatic time synchronization with an NTP server). The NTP (network time protocol) server is a server providing a correct standard time of day. When connected to the NTP server, the multifunction peripheral 1 can set the reference time being kept in itself to the reference time of the NTP server. The multifunction peripheral 1 has the function of connecting to the NTP server to allow the reference time changing section 102 to calibrate the reference time.

The term "predetermined condition" here refers to, for example, (1) when the date and time being kept by the timer section 170 reaches the beginning of daylight-saving time or (2) when the date and time being kept by the timer section 170 reaches a time of day for the automatic time synchronization with the NTP server.

The time modifying section 103 is configured to, when in the middle of fax transmission from the facsimile communication section 140 to the destination the reference time changing section 102 changes the reference time as described above, performs time standardization processing for standardizing the times of day for use by the image processing section 190 to generate time-stamp representations, which are to be synthesized on all the set of pieces of page data being subject to the fax transmission, to either the unchanged reference time before being changed or the changed reference time after being changed. In short, the time modifying section 103 standards the times of day for use in generating the time-stamp representations to the times of day having consistency with either the unchanged reference time or the changed reference time. The definition of the times of day having consistency will be described hereinafter.

For example, (a) when in the middle of fax transmission the reference time changing section 102 changes the reference time and then the determining section 104 determines that the destination for the fax transmission has a replacement function of replacing the time-stamp representation with another time-stamp representation, the time modifying section 103 performs the time standardization processing by sending to the destination a modification command to modify the respective time-stamp representations on already sent pieces of page data to time-stamp representations generated from the times of day having consistency with the changed reference time, together with the generated time-stamp representations.

Alternatively, (b) when in the middle of fax transmission the reference time changing section 102 changes the reference time and then the determining section 104 determines that the destination for the fax transmission does not have the replacement function, the time modifying section 103 performs the time standardization processing by setting the times of day for use by the image processing section 190 to generate time-stamp representations to the times of day having consistency with the unchanged reference time.

The determining section 104 is configured to determine whether or not the destination facsimile apparatus has the replacement function of replacing the time-stamp representation contained in each of the received pieces of page data with another time-stamp representation. For example, the determining section 104 determines whether or not the destination facsimile apparatus has the replacement function based on a facsimile control signal sent back from the destination during fax transmission, for example, an NSF signal serving as a signal for identifying a non-standard function representing an optional function. Based on the determination result of the determining section 104, the time modifying section 103 performs the time standardization processing in either the aforementioned manner (a) or (b).

The multifunction peripheral 1 further includes the operating section 47 and a display 150. The operating section 47 is composed of an image formation or transmission start key, numeric keys, shortcut keys, and so on and configured to receive entry of various operation commands from an operator, for example, in this embodiment, a command to change the reference time or a command to execute the time standardization processing.

The display 150 is formed of an LCD (liquid crystal display) or the like configured to display operation guidance and the like for the operator. The display 150 may also have a touch panel function to serve as the operating section 47 operable to receive entry of various operation commands from the operator.

Figure 2:
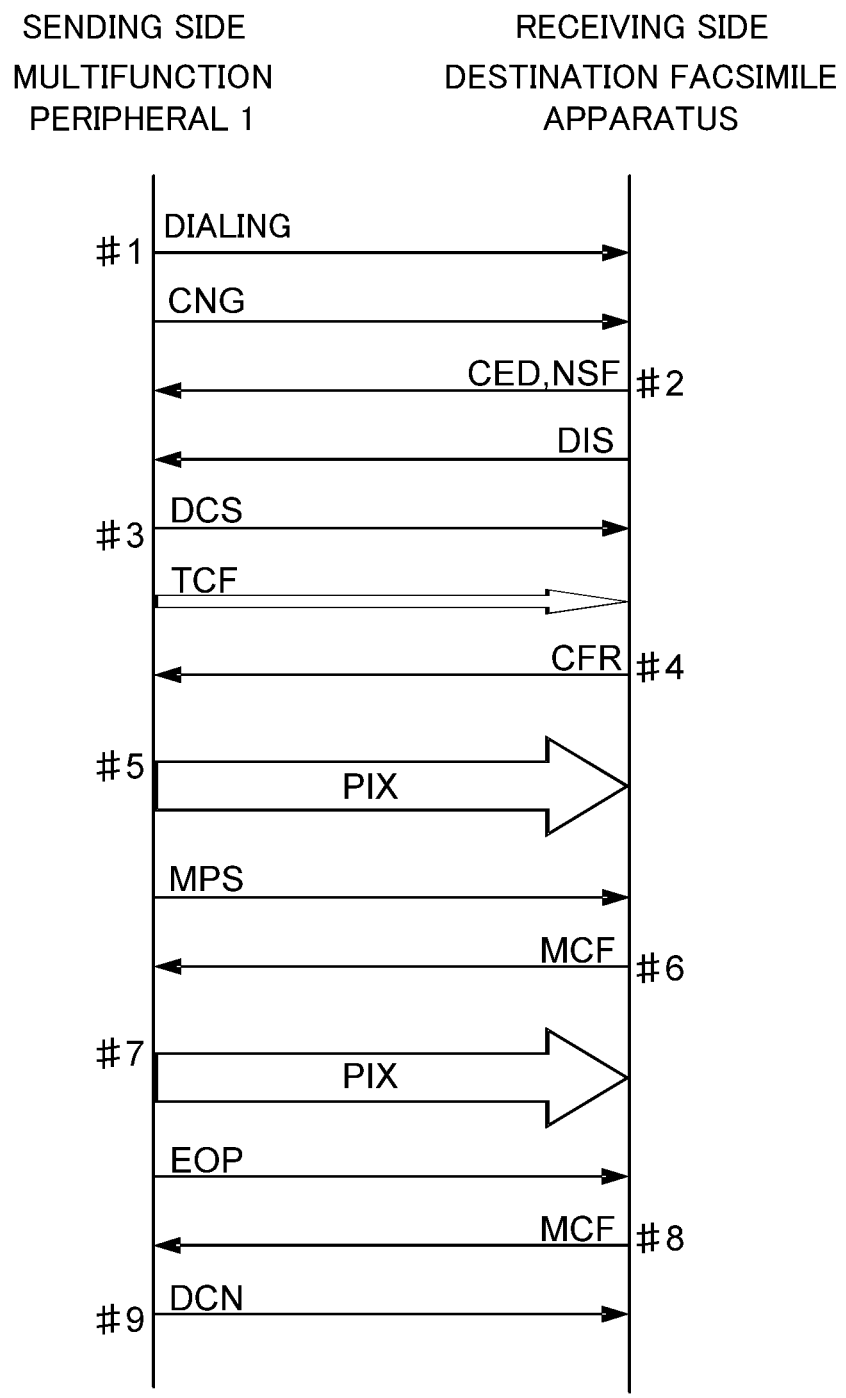
FIG. 2 is a chart showing processing of fax communication between the multifunction peripheral and a facsimile apparatus serving as a destination for fax transmission.

Next, a description will be given of processing of fax communication between the multifunction peripheral 1 and a facsimile apparatus serving as a destination of fax transmission. FIG. 2 is a chart showing the processing of fax communication between the multifunction peripheral 1 and the facsimile apparatus serving as a destination for fax transmission.

In the multifunction peripheral 1 as a sending side, its facsimile communication section 140 (hereinafter, referred to as the multifunction peripheral 1 so far as the description of the processing of facsimile communication is concerned) issues a call to a destination facsimile apparatus by dialing based on a fax transmission command entered by a user's operation of the operating section 47 (i.e., a fax transmission job) and sends a CNG signal to notify the destination facsimile apparatus that the multifunction peripheral 1 is a facsimile apparatus trying to initiate facsimile communication (#1).

When in the destination facsimile apparatus its facsimile communication section (hereinafter, referred to as the destination facsimile apparatus so far as the description of the processing of facsimile communication is concerned) receives, as a receiving side, the CNG signal, the destination facsimile apparatus sends back to the multifunction peripheral 1 a CED signal as a response signal to the CNG signal, an NSF signal as a signal for identifying a non-standard function representing an optional function, and a DIS signal informing the sending side of functions (such as CCITT specification) owned by the receiving side (#2). When the destination facsimile apparatus has the replacement function, it sends back to the multifunction peripheral 1 the NSF signal with the addition thereto of information indicating that the destination facsimile apparatus has the replacement function.

When receiving the CED signal and the DIS signal from the destination facsimile apparatus, the multifunction peripheral 1 sends to the destination facsimile apparatus a DCS signal informing the destination of set-up data (such as CCITT specification) of the multifunction peripheral 1 and a TCF signal for modem training (#3).

When receiving the DCS signal and the TCF signal, the destination facsimile apparatus sends back to the multifunction peripheral 1 a CFR signal indicating successful receipt of the above signals (#4).

When the multifunction peripheral 1 as the sending side receives the CFR signal, it sends to the destination facsimile apparatus a piece of page data (PIX) of the first page being subject to fax transmission in the fax transmission job (#5). In addition, if there is a further piece of page data of another page being subject to the fax transmission, the multifunction peripheral 1 sends to the destination facsimile apparatus an MPS signal indicating that there is a further piece of page data to be subsequently faxed.

The destination facsimile apparatus as the receiving side allows its image memory to temporarily store the received piece of page data (PIX) of the first page. Then, the destination facsimile apparatus sends back to the multifunction peripheral 1 an MCF signal indicating that the piece of page data of the first page has been successfully received (#6).

When the multifunction peripheral 1 receives the MCF signal from the destination facsimile apparatus, it sends to the destination facsimile apparatus a piece of page data (PIX) of the next page and, so long as there is a piece of page data of still another page being subject to the fax transmission, an MPS signal. In this case, the destination facsimile apparatus repeats the processing step #6 of allowing the image memory to temporarily store the received piece of page data (PIX) and sending an MCF signal back to the multifunction peripheral 1. Thereafter, the processing steps #5 and #6 are repeated until the multifunction peripheral 1 completes the transmission of all of a set of pieces of page data being subject to the fax transmission.

Then, when the multifunction peripheral 1 sends to the destination facsimile apparatus a piece of page data (PIX) of the last page being subject to the fax transmission, it sends to the destination facsimile apparatus an EOP signal indicating the end of data transmission (#7). The destination facsimile apparatus sends back to the multifunction peripheral 1 an MCF signal indicating that the piece of page data of the last page has been received (#8).

When the multifunction peripheral 1 receives the above MCF signal from the destination facsimile apparatus after the sending of the EOP signal, it sends to the destination facsimile apparatus a DCN signal and disconnects the line (#9).

Figure 5:
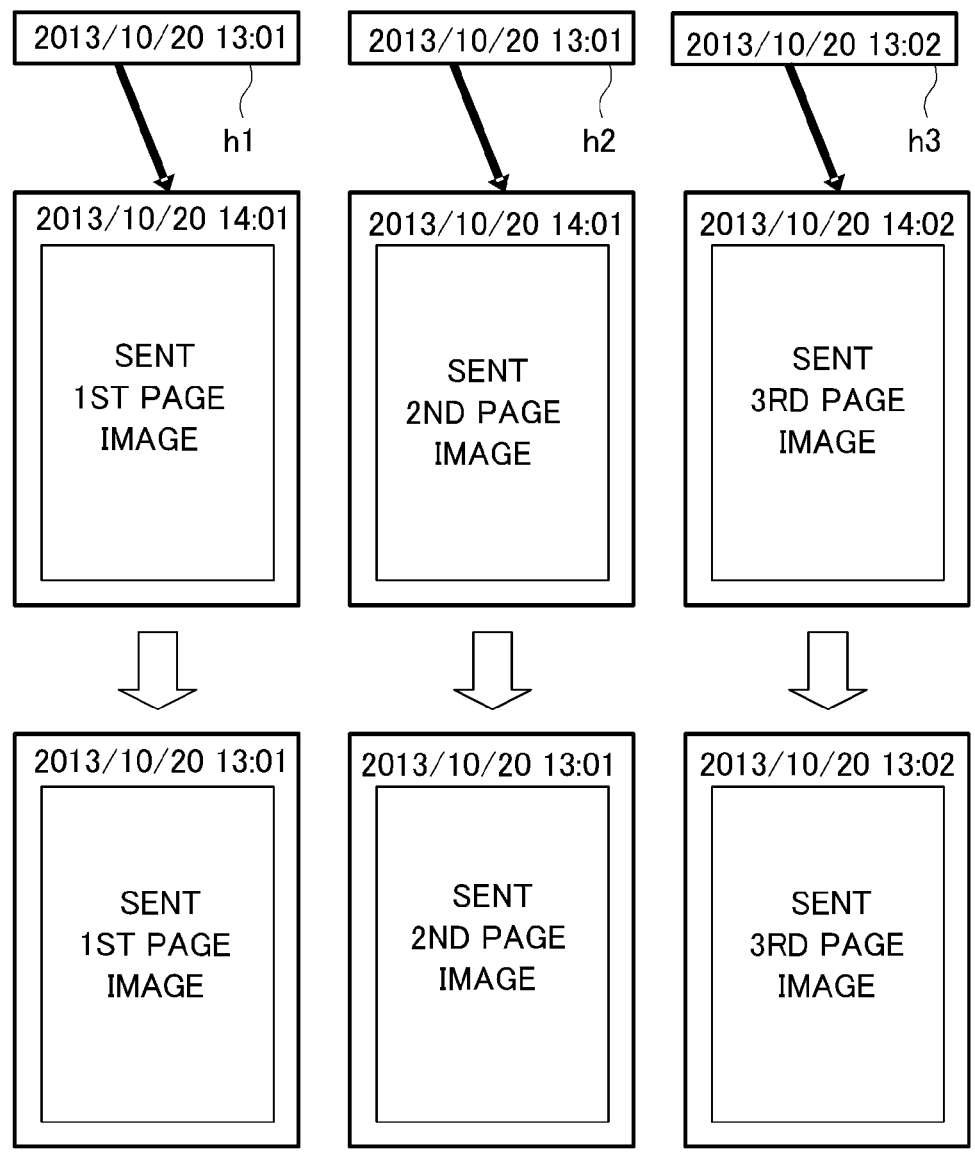
FIG. 5 is a view showing how the content of each piece of page data is changed in a destination facsimile apparatus.
Figure 6:
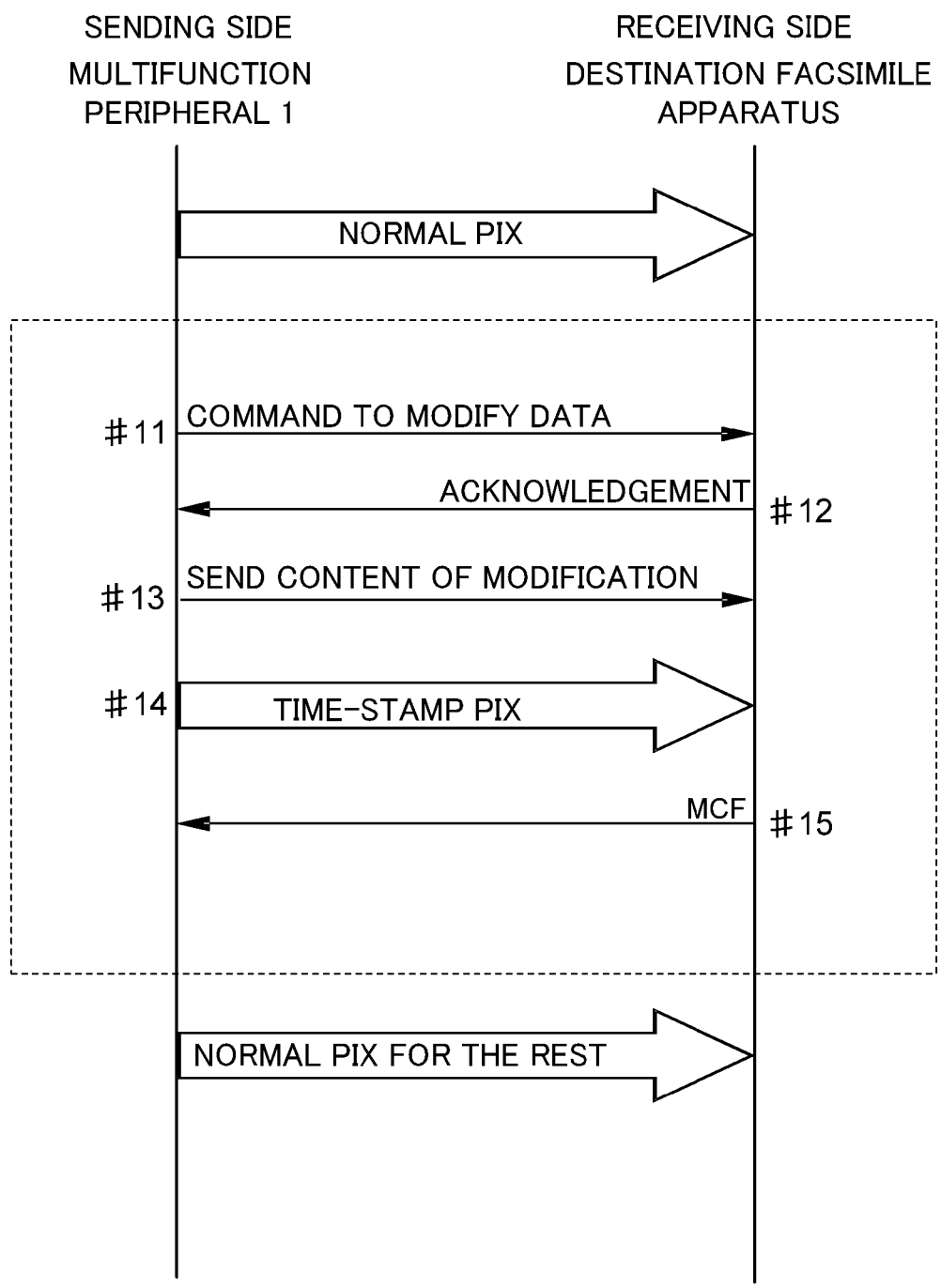
FIG. 6 is a chart showing processing of fax communication between the multifunction peripheral according to the first embodiment and the facsimile apparatus serving as a destination for fax transmission.

Next, a description will be given of an example of fax transmission processing of the multifunction peripheral 1 according to the first embodiment. FIG. 3 is a flowchart showing the fax transmission processing of the multifunction peripheral 1 according to the first embodiment. FIG. 4A is a view showing an example of page images being subject to fax transmission and FIG. 4B is a view showing an example of header images as time-stamp representations newly generated on a page-by-page basis. FIG. 5 is a view showing how the content of each piece of page data is changed in a destination facsimile apparatus. FIG. 6 is a chart showing processing of fax communication between the multifunction peripheral 1 according to the first embodiment and the facsimile apparatus serving as a destination of fax transmission.

For example, when a user places original documents being subject to fax transmission on the document loading chute of the image reading section 110 and enters a facsimile number of a destination and a fax transmission command by operating the operating section 47 of the multifunction peripheral 1, a fax transmission job is received by the control section 101. The control section 101 starts the execution of the fax transmission job (S1). Specifically, the processing from #1 to #9 shown in FIG. 2 is started. The control section 101 allows the timer section 170 to start keeping a reference time to determine the current time of day (S2). The control section 101 drives the image reading section 110 with the start of execution of the fax transmission job to allow the image reading section 110 to start reading the placed original documents (S3). A set of pieces of page data of the original documents acquired by the reading of the image reading section 110 are sequentially stored in the image memory 120.

In faxing each of the pieces of page data stored in the image memory 120 and subject to the fax transmission, the image processing section 190 generates a time-stamp representation for the piece of page data, using the time of day in a reference time t1 being kept by the timer section 170, and synthesizes the generated time-stamp representation on the piece of page data (S4).

Subsequently, the facsimile communication section 140 faxes the piece of page data synthesized with the time-stamp representation to the destination (S5).

During the fax transmission, the reference time changing section 102 determines whether or not the reference time t1 being kept by the timer section 170 matches a predetermined condition, for example, the situation applies to the aforementioned condition (1) or (2) (S6).

Here, if the reference time changing section 102 determines that the reference time t1 matches the predetermined condition (YES in S6), the reference time changing section 102 changes the reference time being kept by the timer section 170 to, for example, the aforementioned daylight-saving time t2 or the aforementioned reference time t2 automatically synchronized in time with the NTP server (S7). In other words, the reference time changing section 102 sets the reference time for use by the image processing section 190 to generate the time-stamp representation to the above changed reference time t2 after being changed.

Subsequently, the timer section 170 starts time-of-day determination T2 with reference to the changed reference time t2 and concurrently starts time-of-day determination T1 with reference to the unchanged reference time t1 before being changed (S8).

Then, the determining section 104 determines whether or not the facsimile control signal (for example, the NSF signal) received from the destination facsimile apparatus by the facsimile communication section 140 contains information indicating that the destination facsimile apparatus has the replacement function and thus determines whether or not the destination facsimile apparatus has the replacement function (S9).

Here, if the determining section 104 determines that the destination facsimile apparatus is a compatible apparatus having the replacement function (YES in S9), the time modifying section 103 modifies the respective times of day tx at the sending of the already faxed pieces of page data to times of day tx obtained by back calculation based on times of day obtained by the time-of-day determination T2 with reference to the changed reference time t2 being kept by the timer section 170 and the image processing section 190 generates respective time-stamp representations indicating the modified times of day tx for the already faxed pieces of page data (S10).

Then, the time modifying section 103 sends to the destination for the fax transmission the time-stamp representations for the pieces of page data generated in S10 and a modification command to modify respective time-stamp representation portions of the pieces of page data already received as viewed from the destination to the respective time-stamp representations generated in S10 and associated with the pieces of page data (S11).

Here, suppose that in the case where the determining section 104 determines that the destination facsimile apparatus is a compatible apparatus and, for example, the multifunction peripheral 1 faxes to the destination images of five pages of original documents, as shown in FIG. 4A, pieces of page data of the first to third pages are first synthesized with time-stamp representations indicating times of day in the reference time t1 having been kept before by the timer section 170 and then faxed to the destination by the facsimile communication section 140, the timer section 170 then detects the advent of the time of introduction of the daylight-saving time, and the reference time changing section 102 thus changes the reference time from the standard time t1 to the daylight-saving time t2.

In this case, the time modifying section 103 makes a setting so that times of day in the changed reference time t2 being kept by the timer section 170 can be used by the image processing section 190 to generate time-stamp representations. Thus, for example, if the current time of day in the reference time t1 having been kept before by the timer section 170 is in the 14-hour range and the current time of day in the changed reference time t2 is in the 13-hour range going back an hour with the advent of the daylight-saving time, then, as shown in FIG. 4A, the headers as time-stamp representations indicating the fax transmission times of day of the already sent pieces of page data originally show 2013/10/20 14:01 for the first page, 2013/10/20 14:01 for the second page, and 2013/10/20 14:02 for the third page and the headers of pieces of page data to be subsequently faxed after the change of reference time show 2013/10/20 13:03 for the fourth page and 2013/10/20 13:04 for the fifth page.

In this embodiment, in this case, the time modifying section 103 makes a setting so that the times of day tx in the changed reference time t2 being kept after the change of reference time, obtained by back calculation of going back an hour with the advent of the daylight-saving time, can be used to re-generate time-stamp representations to be synthesized on the already sent pieces of page data of the first to third pages. As shown in FIG. 4B, the image processing section 190 generates new headers for the pieces of page data of the first to third pages using the respective transmission times of day tx for the pieces of page data obtained by the back calculation, resulting in obtaining 2013/10/20 13:01 as a header image h1 for the first page, 2013/10/20 13:01 as a header image h2 for the second page, and 2013/10/20 13:02 as a header image h3 for the third page.

Then, the time modifying section 103 sends, to the destination through the facsimile communication section 140, the re-generated header images (time-stamp representations) for the first to third pages and a modification command to modify the header images for the pieces of page data already received by the destination to the re-generated header images.

Thus, as shown in FIG. 5, the destination facsimile apparatus performs, according to the modification command received from the multifunction peripheral 1 as the sending side, modification processing for modifying the header image portions of the pieces of page data (the middle row in FIG. 5) of the first to third pages already received and stored in the image memory to the header images h1, h2, h3 (the top row in FIG. 5) for the first to third pages received from the multifunction peripheral 1 as the sending side. As a result, as shown in the bottom row in FIG. 5, the pieces of page data of the first to third pages are modified to contain the header 2013/10/20 13:01 for the first page, the header 2013/10/20 13:01 for the second page, and the header 2013/10/20 13:02 for the third page, respectively.

In this manner, the times of day indicated at the headers added to all the set of five pieces of page data of five pages by the multifunction peripheral 1 are standardized to the times of day having consistency with the reference time after the introduction of the daylight-saving time, i.e., the times of day having consistency with the new, changed reference time. The same applies to the case where the reference time changing section 102 calibrates the reference time by automatic time synchronization with the NTP server.

In the fax communication in these cases, as shown in FIG. 6, the facsimile communication section 140 of the multifunction peripheral 1 sends to the destination facsimile apparatus a start signal indicating the start of data transmission for the above modification processing based on the time-stamp representations generated in S10 (#11).

Upon receipt of the start signal, the destination facsimile apparatus sends an acknowledgement message back to the multifunction peripheral 1 (#12).

When the multifunction peripheral 1 receives the acknowledgement message from the destination facsimile apparatus, it sends a modification signal showing the content of the modification processing (#13). The start signal and the modification signal constitute the aforementioned modification command.

Subsequently, the multifunction peripheral 1 sends to the destination facsimile apparatus the time-stamp representations for the associated pages generated in S10, which are data for use in the modification processing (#14).

The destination facsimile apparatus performs the processing for allowing the image memory to temporarily store the received pieces of time-stamp data (PIX) and sending an MCF signal back to the multifunction peripheral 1 (#15).

When the sending of the respective time-stamp representations for the already sent pieces of page data and the modification command is completed by the facsimile communication section 140 in the above manner, the processing for faxing a piece of page data of the next page is started (YES in S13 and S4 to S12, where S12 will be described hereinafter).

On the other hand, if the determining section 104 determines that the destination facsimile apparatus does not have the replacement function (is not a compatible apparatus, i.e., NO in S9), the time modifying section 103 makes a setting so that the times of day obtained by the time-of-day determination T1 with reference to the unchanged reference time t1 before the change of reference time in S7 are also used as the times of day for use by the image processing section 190 to generate the time-stamp representations after the change of reference time in S7 (S12). Thus, the pieces of page data of the next and subsequent pages to be subsequently faxed after the change of reference time in S7 are synthesized with their respective time-stamp representations indicating the times of day obtained by the time-of-day determination T1 with reference to the above unchanged reference time t1.

Figure 7:
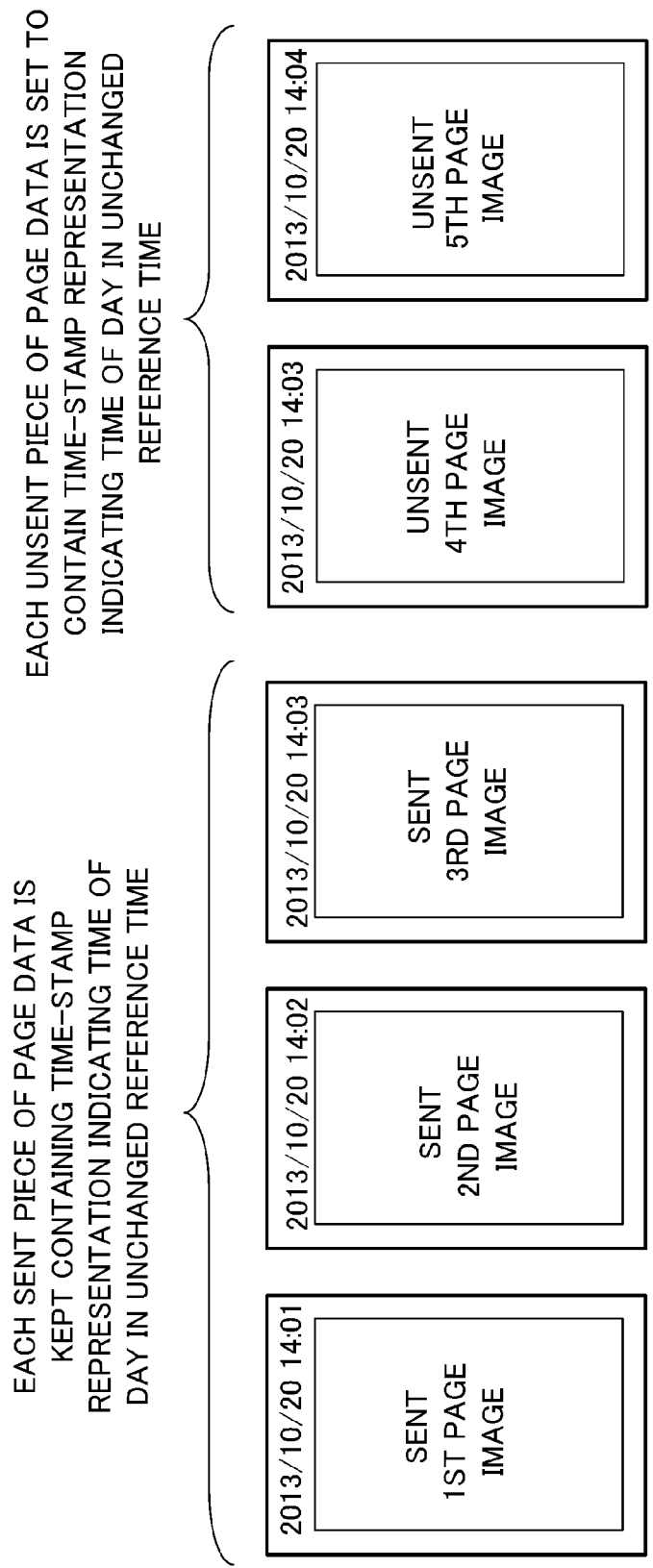
FIG. 7 is a view showing an example of the contents of pieces of page data received by the destination facsimile apparatus.

FIG. 7 is a view showing an example of the contents of pieces of page data received by the destination facsimile apparatus. For example, supposed that in the case where the determining section 104 determines that the destination facsimile apparatus is not a compatible apparatus and, like the aforementioned case, the multifunction peripheral 1 faxes to the destination images of five pages of original documents, as shown in FIG. 7, pieces of page data of the first to third pages are first synthesized with time-stamp representations indicating times of day in the reference time t1 having been set before in the multifunction peripheral 1 and then faxed to the destination by the facsimile communication section 140 and the reference time changing section 102 then changes the reference time t1 to another reference time. For example, suppose that the headers as time-stamp representations indicating the fax transmission times of day of the already sent pieces of page data originally show 2013/10/20 14:01 for the first page, 2013/10/20 14:02 for the second page, and 2013/10/20 14:03 for the third page.

If the daylight-saving time is introduced into the multifunction peripheral 1 by the above change of reference time, so that the time of day goes back an hour, then the headers of next and subsequent pieces of page data to be subsequently faxed might show, for example, 2013/10/20 13:03 for the fourth page and 2013/10/20 13:04 for the fifth page.

However, in this embodiment, the time modifying section 103 in this case sets the times of day for use by the image processing section 190 to generate time-stamp representations for the next and subsequent pages to the times of day obtained by the time-of-day determination T1 with reference to the unchanged reference time t1. The image processing section 190 generates respective new headers for the pieces of page data of the fourth and fifth pages using times of day obtained by the time-of-day determination T1 and synthesizes the respective generated time-stamp representations on the pieces of page data of the fourth and fifth pages to be subsequently faxed to provide headers 2013/10/20 14:03 and 2013/10/20 14:04 for the fourth and fifth pages, respectively.

In this manner, the times of day indicated at the headers added to the all the set of five pieces of page data of five pages by the multifunction peripheral 1 are standardized to the times of day having consistency with the reference time before the introduction of the daylight-saving time, i.e., the times of day having consistency with the unchanged reference time. The same applies to the case where the reference time changing section 102 calibrates the reference time by automatic time synchronization with the NTP server.

If in S6 the reference time changing section 102 determines that the reference time t1 being kept by the timer section 170 does not match the predetermined condition (NO in S6), the process does not perform S7 to S12, skips to S13, and performs the processing for a piece of page data of the next page being subject to the fax transmission. In other words, for the piece of page data of the next page being subject to the fax transmission, neither generation nor synthesis of a time-stamp representation in the above manner is performed, a time-stamp representation is generated instead using the time of day in the current reference time t1, and the generated time-stamp representation is synthesized on the piece of page data of the next page.

Thereafter, when all of unsent pieces of page data stored in the image memory 120 has been faxed by the facsimile communication section 140 and the image memory 120 no longer stores unsent pieces of page data (NO in S13), the fax transmission job ends.

As thus far described, in the multifunction peripheral 1 according to the first embodiment, when in the middle of fax transmission the reference time changing section 102 changes the reference time in the above manner and then the determining section 104 determines that the destination for the fax transmission is a compatible apparatus, the time modifying section 103 sends to the destination a modification command to modify the time-stamp representations on the already sent pieces of page data to time-stamp representations indicating the times of day in the changed reference time. Therefore, in the destination facsimile apparatus, images of pages of original documents containing the time-stamp representations having consistency with the transmission times of day after the change of reference time can be obtained.

On the other hand, in the multifunction peripheral 1 according to the first embodiment, when in the middle of fax transmission the reference time changing section 102 changes the reference time and then the determining section 104 determines that the destination for the fax transmission is not a compatible apparatus, the time modifying section 103 sets the times of day for use by the image processing section 190 to generate time-stamp representations to the times of day in the unchanged reference time. Therefore, in the destination facsimile apparatus, images of pages of original documents containing the time-stamp representations having consistency with the transmission times of day before the change of reference time can be obtained.

To sum up, in the multifunction peripheral 1 according to the first embodiment, when in the middle of fax transmission of the facsimile communication section 140 to a destination the reference time changing section 102 changes the reference time, the time modifying section 103 standardizes the times of day for use in generating the time-stamp representations to be synthesized on the set of pieces of page data of all pages being subject to the fax transmission to the times of day having consistency with either the unchanged reference time or the changed reference time. Therefore, in the destination facsimile apparatus, images of pages of original documents can be obtained which contain their respective time-stamp representations in which the transmission times of day attached to the images of the pages of the original documents after the change of reference time are consistent with the transmission times of day attached to those before the change of reference time.

Although the multifunction peripheral 1 according to the first embodiment includes the aforementioned determining section 104 and, depending upon the determination result of the determining section 104, both of the processing steps S10 and S11 or the processing step S12 is selectively performed, the multifunction peripheral 1 may not include the determining section 104 and may therefore perform the processing steps S10 and S11 only or perform the processing step S12 only. The same applies to a multifunction peripheral 1 according to a second embodiment to be described hereinafter and the following examples of fax transmission processing.

For example, as described in BACKGROUND, there is known a facsimile apparatus in which in transmitting an image of an original document being subject to fax transmission to a destination facsimile apparatus, a representation of additional information indicating a fax transmission date and time or the like is attached as a header, a footer or the like to the image of the original document. In such a known facsimile apparatus, even if the sending facsimile apparatus modifies the fax transmission date and time from the previous date and time using its time zone (daylight-saving time or the like) changing function or time calibration function, the representation of additional time-stamp information on the already sent image of the original document cannot be modified. Therefore, in the destination facsimile apparatus, there may arise a situation where the receipt times of day of a set of pieces of page data from the sending facsimile apparatus significantly differ from each other or a situation where a piece of page data received later has an earlier receipt time of day than a piece of page data received earlier, which may confuse the user.

Furthermore, although in the other facsimile apparatus described in BACKGROUND an image of an original document being subject to fax transmission, acquired by scanning the original document, is first confirmed on the display and then edited, the facsimile apparatus does not address the modification of an image of an original document already sent to the destination.

Unlike the above known techniques, in the multifunction peripheral 1 according to the first embodiment, even if in the middle of fax transmission of a set of images of original document pages the reference time being used to attach transmission time stamps to the images of the original document pages being subject to the fax transmission is changed owing to the change of time zone, the calibration of time or the like, it can be avoided that the fax transmission date and time attached to the images of the original document pages after the change of reference time may confuse the fax recipient.

Figure 8:
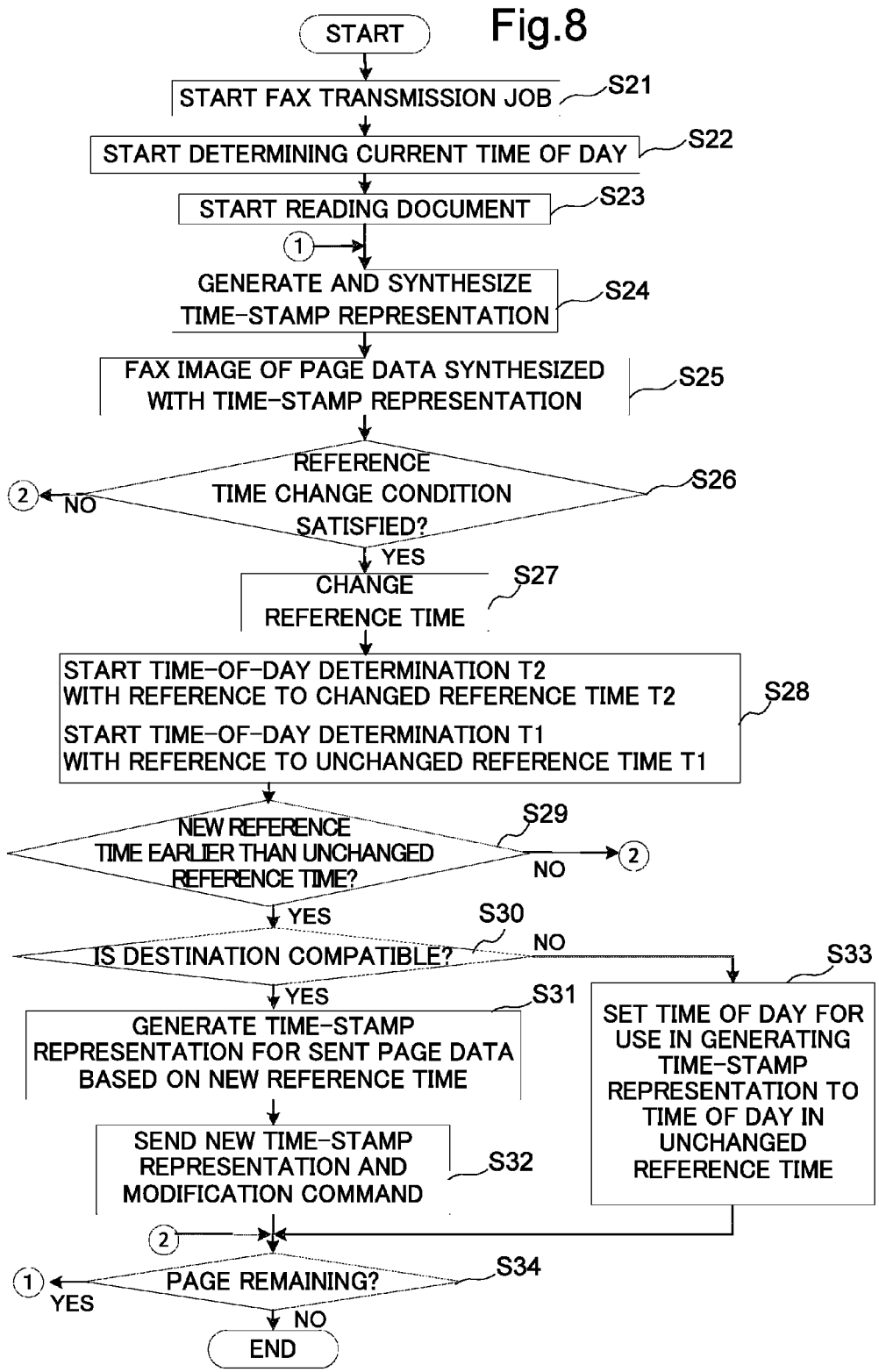
FIG. 8 is a flowchart showing another example of fax transmission processing of the multifunction peripheral according to the first embodiment.

Next, a description will be given of another example of fax transmission processing of the multifunction peripheral 1 according to the first embodiment. FIG. 8 is a flowchart showing the example of fax transmission processing of the multifunction peripheral 1 according to the first embodiment. Further explanation of the same processing steps as those in the example of fax transmission processing shown in FIG. 3 will not be given.

In this fax transmission processing, when the reference time changing section 102 determines that the reference time t1 being kept by the timer section 170 matches the aforementioned condition (YES in S26) and changes the reference time for use by the image processing section 190 to generate the time-stamp representation to another reference time (S27), the time modifying section 103 determines whether or not the new reference time t2 to be adopted by the change of reference time will be earlier than the unchanged reference time t1 (S29).

Here, if the time modifying section 103 determines that the new reference time t2 will be earlier than the unchanged reference time t1 (YES in S29), one type of time standardization processing in S31 and S32 (the same as that in S10 and S11 in FIG. 3) or another type of time standardization processing in S33 (the same as that in S12 in FIG. 3) is performed depending upon the result of determination (S30) of the determining section 104.

On the other hand, if the time modifying section 103 determines that the new reference time t2 will not be earlier than the unchanged reference time t1 (NO in S29), it sets the reference time for use by the image processing section 190 to generate the time-stamp representation to the new reference time t2. In this case, the process does not perform S30 to S33 and skips to S34.

Therefore, when, regarding pieces of page data received by the destination facsimile apparatus, the time of day indicated by a time-stamp representation attached to a piece of page data to be received later will be earlier than the time of day indicated by a time-stamp representation attached to a piece of page data received earlier, so that the user viewing these received pieces of page data may be highly likely to be confused about the understanding of the receipt times of day of them, the above time standardization processing is performed. On the other hand, when there is no inconsistency in temporal relation between the time of day indicated by a time-stamp representation attached to a piece of page data received earlier and the time of day indicated by a time-stamp representation attached to a piece of page data to be received later, which may be less likely to confuse the user, the above time standardization processing is not performed. Thus, it is possible to perform the above time standardization processing only when actually contributing to the prevention of user's confusion.

Figure 9:
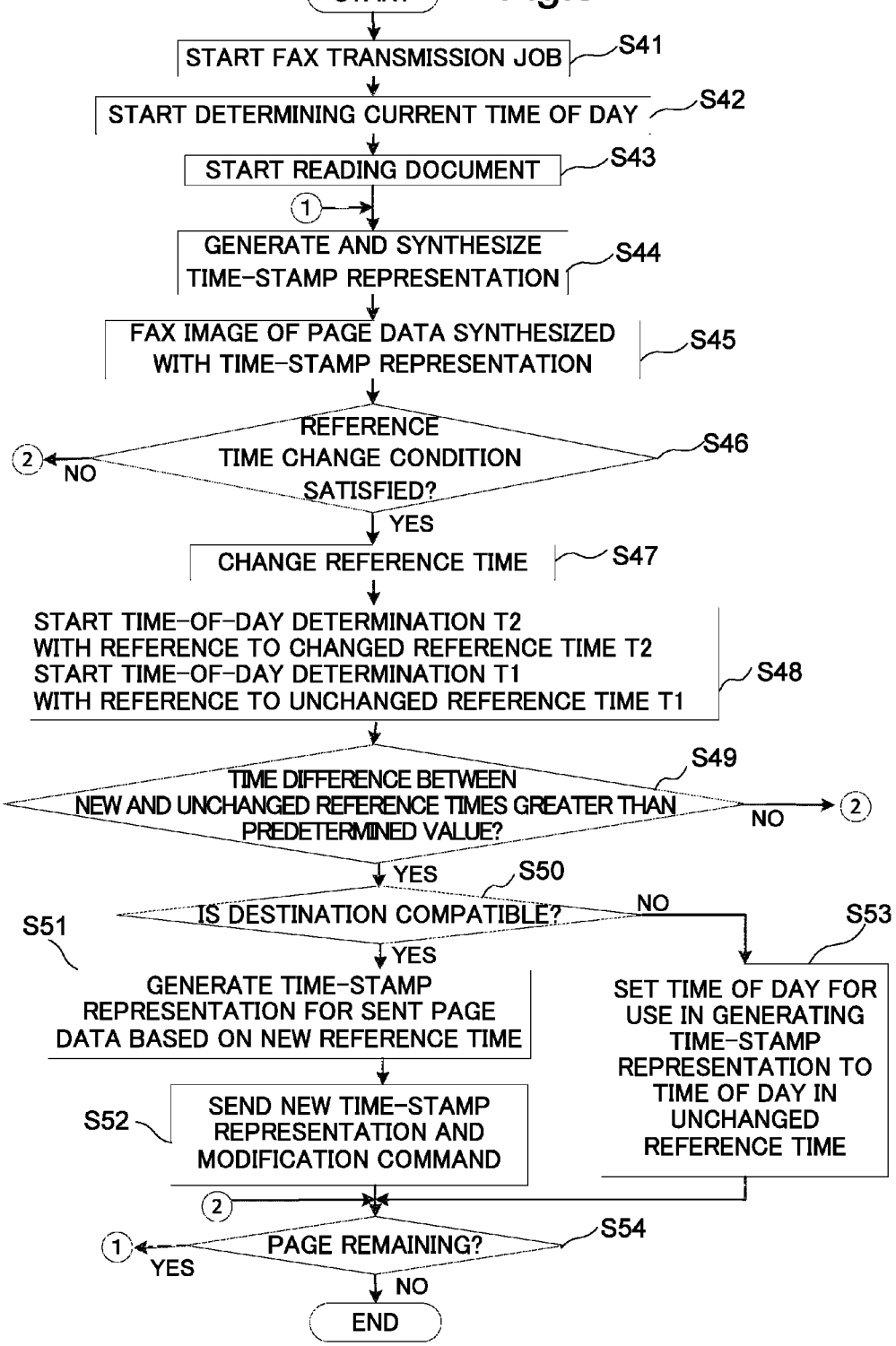
FIG. 9 is a flowchart showing still another example of fax transmission processing of the multifunction peripheral according to the first embodiment.

Next, a description will be given of still another example of fax transmission processing of the multifunction peripheral 1 according to the first embodiment. FIG. 9 is a flowchart showing the example of fax transmission processing of the multifunction peripheral 1 according to the first embodiment.

Further explanation of the same processing steps as those in the example of fax transmission processing shown in FIG. 3 or 8 will not be given.

In this fax transmission processing, when the reference time changing section 102 determines that the reference time t1 being kept by the timer section 170 matches the aforementioned condition (YES in S46) and changes the reference time for use by the image processing section 190 to generate the time-stamp representation to another reference time (S47), the time modifying section 103 determines whether or not the time difference between the unchanged and changed reference times caused by the change of reference time of the reference time changing section 102 is greater than a predetermined value (S49).

For example, the time modifying section 103 determines whether or not the time difference between the reference time t1 before the change of reference time of the reference time changing section 102 and the reference time t2 after the change of reference time is greater than the predetermined value, for example, one minute.

Here, if the time modifying section 103 determines that the time difference between the unchanged and changed reference times caused by the change of reference time of the reference time changing section 102 is greater than the predetermined value (YES in S49), one type of time standardization processing in S51 and S52 (the same as that in S10 and S11 in FIG. 3) or another type of time standardization processing in S53 (the same as that in S12 in FIG. 3) is performed depending upon the result of determination (S50) of the determining section 104.

On the other hand, if the time modifying section 103 determines that the time difference between the unchanged and changed reference times caused by the change of reference time of the reference time changing section 102 is not greater than the predetermined value (NO in S49), it sets the reference time for use by the image processing section 190 to generate the time-stamp representation to the new reference time t2. In this case, the process does not perform S50 to S53 and skips to S54.

Therefore, when in the destination facsimile apparatus the time difference between the unchanged and changed reference times caused by the change of reference time of the reference time changing section 102 is great, so that the user receiving pieces of page data via fax may be highly likely to be confused about the understanding of the receipt times of day of them, the above time standardization processing is performed. On the other hand, when the time of day indicated by a time-stamp representation attached to a piece of page data received earlier is relatively close to the time of day indicated by a time-stamp representation attached to a piece of page data to be received later, which may be less likely to confuse the user, the above time standardization processing is not performed. Thus, it is possible to perform the above time standardization processing only when actually contributing to the prevention of user's confusion.

Figure 10:
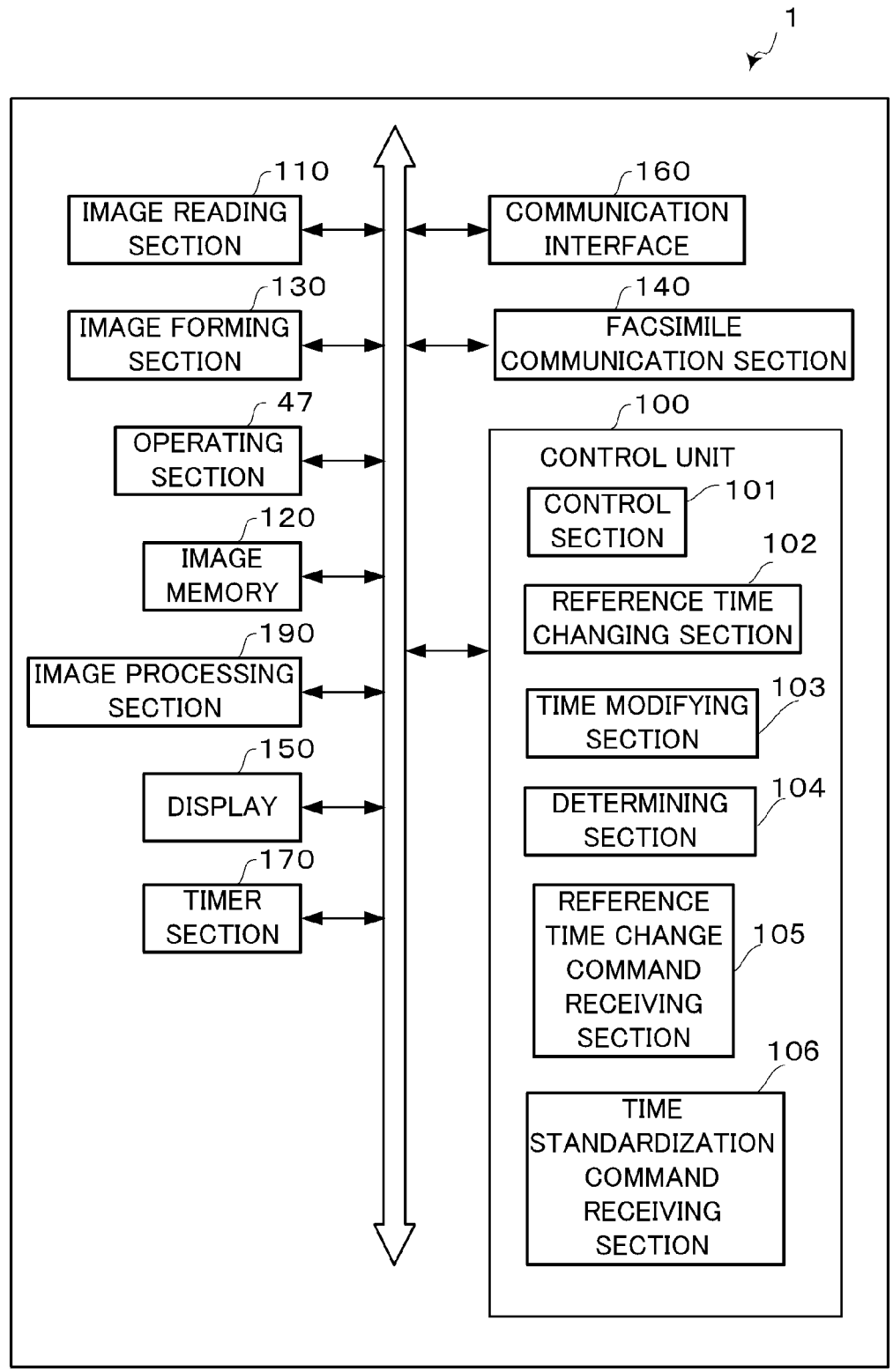
FIG. 10 is a block diagram schematically showing the electric configuration of a multifunction peripheral according to a second embodiment.

Next, a description will be given of a multifunction peripheral 1 according to a second embodiment. FIG. 10 is a block diagram schematically showing the electric configuration of the multifunction peripheral 1 according to the second embodiment. Further explanation of the same configuration as that in the first embodiment will not be given.

In the multifunction peripheral 1 according to the second embodiment, the control unit 100 further includes a reference time change command receiving section 105 and a time standardization command receiving section 106.

The reference time change command receiving section 105 is configured to, based on a user's operation of the operating section 47, receive a reference time change command to change the reference time from the user.

The time standardization command receiving section 106 is configured to receive a time standardization command to execute the aforementioned time standardization processing from the user. The time standardization processing used here refers to both of (i) a sequence of steps S10 and S11 in FIG. 3 and (ii) a step S12 in FIG. 3 or either one of (i) and (ii).

In the multifunction peripheral 1 according to the second embodiment, the time modifying section 103 executes the aforementioned time standardization processing when the time standardization command receiving section 106 receives a time standardization command.

Furthermore, the control section 101 functions as a display control section and, when the reference time change command receiving section 105 receives a reference time change command from a user, allows the display 150 to display a message that the time standardization processing is executable.

Also in the multifunction peripheral 1 according to the second embodiment, the control unit 100 functions as the reference time changing section 102, the time modifying section 103 or the determining section 104 or also as the control section 101 serving as the display control section, the reference time change command receiving section 105 or the time standardization command receiving section 106 by operating according to the fax communication program stored in the unshown HDD or ROM. However, each of the reference time changing section 102, the time modifying section 103, the determining section 104, the control section 101 as the display control section, the reference time change command receiving section 105, and the time standardization command receiving section 106 may not be implemented by the operation according to the fax communication program but may be constituted by a hardware circuit.

Figure 11:
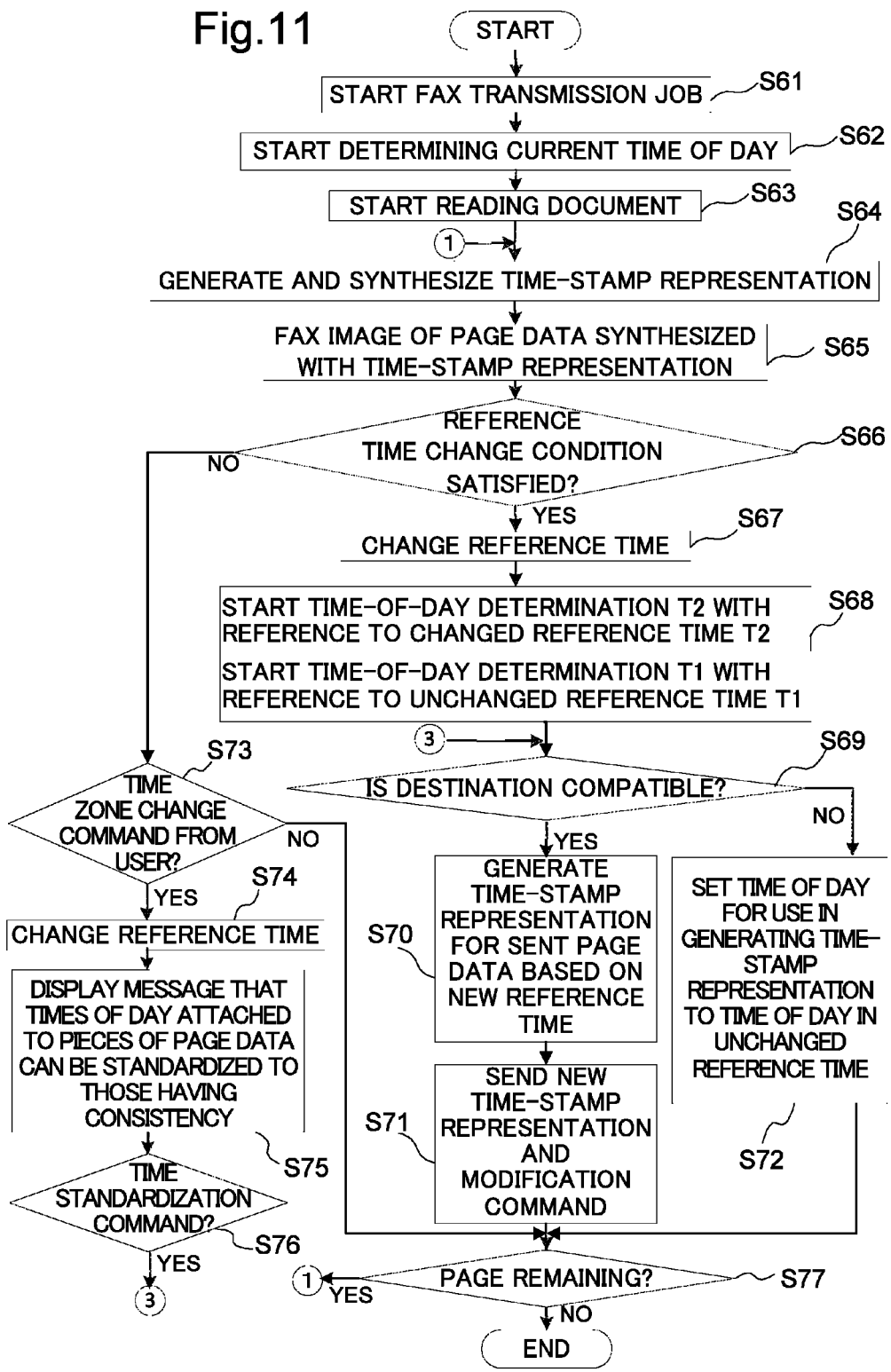
FIG. 11 is a flowchart showing fax transmission processing of the multifunction peripheral according to the second embodiment.

Next, a description will be given of an example of fax transmission processing of the multifunction peripheral 1 according to the second embodiment. FIG. 11 is a flowchart showing the fax transmission processing of the multifunction peripheral 1 according to the second embodiment. Further explanation of the same processing steps as those in the example of fax transmission processing shown in FIG. 3, 8 or 9 will not be given.

In the fax transmission processing of the multifunction peripheral 1 according to the second embodiment, when the reference time change command receiving section 105 receives a reference time change command from a user based on the user's operation of the operating section 47 (YES in S73) even if the reference time changing section 102 determines that the reference time t1 being kept by the timer section 170 does not match the predetermined condition (NO in S66), the reference time changing section 102 changes the reference time for use by the image processing section 190 to generate the time-stamp representation to another reference time (S74). At this time, as shown in FIG. 12, the control section 101 allows the display 150 to display a message that the time standardization processing is executable, for example, a message that respective time-stamp representations to be attached to a set of pieces of page data can be standardized to respective time-stamp representations indicating times of day having consistency with either the unchanged or changed reference time (S75).

Figure 12:
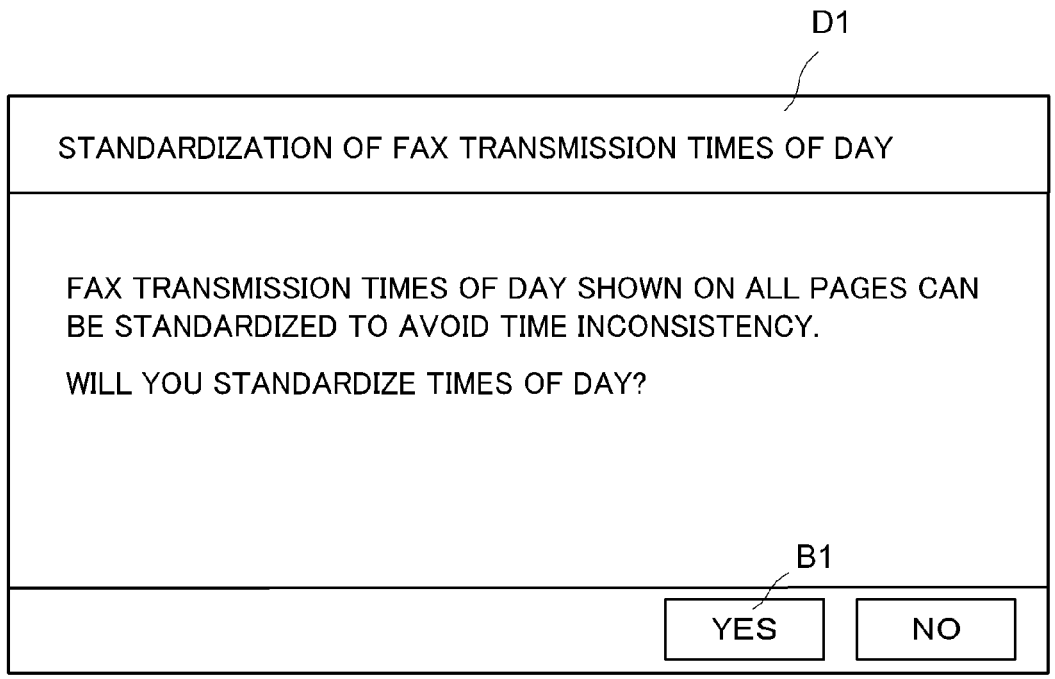
FIG. 12 is a view showing an example of a display screen of a display.

Here, when a time standardization command is entered based on the user's operation of the operating section 47, for example, using a touch panel function in which the user presses an enter button B1 on a display screen D1 shown in FIG. 12, so that the time standardization command receiving section 106 receives the time standardization command (YES in S76), the process proceeds to S69. Thus, one type of time standardization processing in S70 and S71 (the same as that in S10 and S11 in FIG. 3) or another type of time standardization processing in S72 (the same as that in S12 in FIG. 3) is performed depending upon the result of determination (S69) of the determining section 104.

On the other hand, if in S73 the reference time change command receiving section 105 does not receive any reference time change command (NO in S73) or if in S76 the time standardization command receiving section 106 does not receive any time standardization command (NO in S76), the process proceeds to S77.

In this embodiment, when the reference time has been changed based on a command from a user, the user can select from between an option in which time-stamp representations to be attached to a set of pieces of page data are standardized to have consistency with the reference time either before or after being changed and an option in which time-stamp representations indicating times of day as directly determined in the reference times before and after being changed are attached to the set of pieces of page data.

The present disclosure is not limited to the configurations of the above embodiments and can be modified in various ways. The configurations and processing shown in the above embodiments with reference to FIGS. 1 to 12 are merely illustrative of the present disclosure and not intended to limit the present disclosure to the above particular configurations and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A facsimile apparatus comprising:
a data acquisition section configured to acquire data being subject to fax transmission as a set of pieces of page data on a page-by-page basis;
a timer section configured to keep a reference time to determine a time of day;
an image processing section configured to generate, for each of the set of pieces of page data acquired by the data acquisition section, a time-stamp representation indicating the time of day determined by the timer section and synthesize the time-stamp representation on the each of the set of piece of page data;
a storage section configured to temporarily store the pieces of page data synthesized with the respective time-stamp representations by the image processing section;
a fax transmission section configured to retrieve the temporarily stored pieces of page data in the storage section on a page-by-page basis and fax retrieved pieces of page data to a designated destination on a page-by-page basis in page order;
a reference time changing section configured to change, when a predetermined condition is satisfied, the reference time being kept by the timer section; and
a time modifying section configured to, decide whether the reference time changing section has changed the reference time being kept by the timer section in the middle of the fax transmission from the fax transmission section to the destination, because of the predetermined condition being satisfied; and perform, when the reference time changing section has changed the reference time, time standardization for standardizing the times of day for use by the image processing section to generate the time-stamp representations, which are to be synthesized on all the set of pieces of page data being subject to the fax transmission and including the pages already transmitted by the fax transmission section and the pages yet to be transmitted by the fax transmission section, to the times of day in either the unchanged reference time before being changed or the changed reference time after being changed.

2. The facsimile apparatus according to claim 1, further comprising a determining section configured to determine whether or not a facsimile apparatus serving as the destination has a replacement function of replacing the time-stamp representation contained in each of the received pieces of page data with another time-stamp representation,
wherein when the reference time changing section changes the reference time in the middle of the fax transmission and the determining section determines that the destination for the fax transmission has the replacement function, the time modifying section performs the time standardization by sending to the destination a modification command to modify the time-stamp representation for each of the already sent pieces of page data to a time-stamp representation indicating the time of day in the changed reference time, together with the modified time-stamp representation.

3. The facsimile apparatus according to claim 2, wherein when the reference time changing section changes the reference time in the middle of the fax transmission and then the determining section determines that the destination for the fax transmission has the replacement function,
the time modifying section modifies the time of day at the sending of each of the already sent pieces of page data to a time of day which is obtained by back calculation based on the changed reference time being kept by the timer section and has consistency with the changed reference time, and
the image processing section sets the time of day which is obtained by back calculation based on the changed reference time as the time of day in the changed reference time, and generates, for each of the already sent pieces of page data, a time-stamp representation indicating the time of day in the changed reference time.

4. The facsimile apparatus according to claim 1, further comprising a determining section configured to determine whether or not a facsimile apparatus serving as the destination has a replacement function of replacing the time-stamp representation contained in each of the received pieces of page data with another time-stamp representation,
wherein when the reference time changing section changes the reference time in the middle of the fax transmission and then the determining section determines that the destination for the fax transmission does not have the replacement function, the time modifying section performs the time standardization by setting the times of day for use by the image processing section to generate the time-stamp representations to the times of day in the unchanged reference time before being changed.

5. The facsimile apparatus according to claim 4,
wherein when the reference time changing section changes the reference time in the middle of the fax transmission, the timer section keeps both the unchanged reference time before being changed and the changed reference time after being changed, and
wherein when the reference time changing section changes the reference time in the middle of the fax transmission and then the determining section determines that the destination for the fax transmission does not have the replacement function, the time modifying section sets the time of day at the sending of each unsent one of the set of pieces of page data to the time of day in the unchanged reference time being kept by the timer section, and the image processing section generates, for each unsent one of the set of pieces of page data, a time-stamp representation indicating the time of day in the unchanged reference time.

6. The facsimile apparatus according to claim 1, wherein the time modifying section performs the time standardization when the time of day indicated by the time-stamp representation to be synthesized on an unsent one of the set of pieces of page data being subject to the fax transmission is earlier than the time of day indicated by the time-stamp representation synthesized on an already sent one of the set of piece of page data.

7. The facsimile apparatus according to claim 1, wherein the time modifying section performs the time standardization when determining that a time difference between the unchanged and changed reference times caused by the change of reference time of the reference time changing section is greater than a predetermined value.

8. The facsimile apparatus according to claim 1, further comprising:

a display;

a reference time change command receiving section configured to receive from a user a reference time change command to change the reference time being kept by the timer section;

a display control section configured to, when the reference time change command receiving section receives the reference time change command from the user, allow the display to display a message that the time standardization is executable; and a time standardization command receiving section configured to receive from the user a time standardization command to execute the time standardization, wherein the time modifying section performs the time standardization when the time standardization command receiving section receives the time standardization command.

\* \* \* \* \*